Dec. 27, 1960 — R. GUERNSEY, JR — 2,966,673
DIGITAL TRANSDUCER
Filed July 30, 1959 — 2 Sheets-Sheet 1
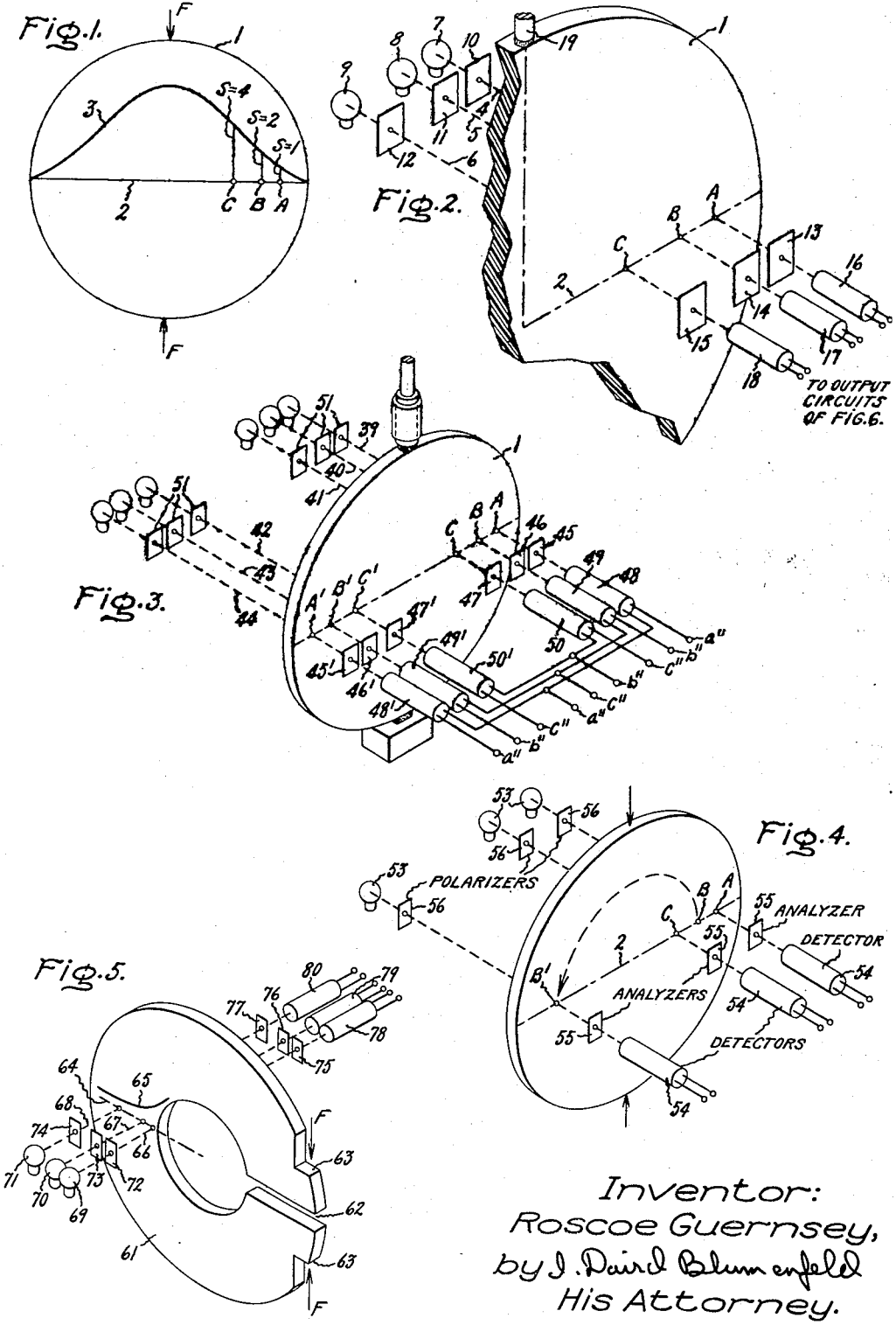
Inventor:
Roscoe Guernsey,
by J. David Blumenfeld
His Attorney.

OUTPUT TO
UNIJUNCTION TRANSISTOR
SWITCHES 25 OF FIG.6

United States Patent Office 2,966,673
Patented Dec. 27, 1960

2,966,673

DIGITAL TRANSDUCER

Roscoe Guernsey, Jr., Schenectady, N.Y., assignor to General Electric Company, a corporation of New York Filed July 30, 1959, Ser. No. 830,599

9 Claims. (Cl. 340—347)

The instant invention relates to a transducer apparatus and, more particularly, one for producing an output in a digitally coded form.

Recent investigations have shown that a transducer construction which converts an analogue input into an output in digital form may be achieved by utilizing a sensor which exhibits temporary double refraction under stress. The stress sensitive element of the transducer has a stepped geometry so that the ratio of stresses in different portions of the element is always constant. If plane polarized light is transmitted through these different portions and the member is loaded, the polarization of the light passing through each of the portions is changed, causing the light intensities to vary cyclically between two levels with applied load. The repetition frequencies of these cyclic light intensity variations then correspond to the ratio of the stresses in the portions, and if the stress ratio is binary in nature (i.e., follows the relationship $1:2:4:8: \ldots 2^n$), the repetition frequencies are also related in this binary ratio. By converting the different cyclically varying light intensities into digital outputs, an output in binary form may be obtained. Such a digital transducer apparatus is disclosed in an application filed concurrently herewith in the name of Frederick A. Ludewig, Jr., Serial Number 830,598, filed July 30, 1959, entitled "Digital Transducer" and assigned to the assignee of the present invention.

In the transducer assembly described above the stress sensitive member has a stepped geometry so that the member comprises a plurality of individual sections of different cross-sections. The stresses in these sections are, for all practical purposes, discontinuous and the stress distribution in the individual sections is determined by the ratio of the cross-sectional areas of the sections. As a result, the geometry of the stress sensitive member is critical if ambiguity is to be avoided and the desired stress ratios are to be maintained. It follows, therefore, that the fabrication of the stress member is very important in producing an accurate and useful instrumentality.

Furthermore, because of the stepped geometry of the stress sensitive member, the size of the instrument may under some circumstances become a limiting factor. While this is not objectionable in the majority of cases, there may be circumstances in which a more compact transducer assembly construction is highly desirable. It is the purpose of the instant invention to provide a compact digital transducer which is simple to fabricate and inexpensive to manufacture.

It is an object of this invention, therefore, to provide a digital transducer assembly utilizing a stress sensitive member in which the stress distribution under load is continuous from point to point;

A further object of this invention is to provide a digital transducer in which the stress distribution in a stress sensitive member is non-linear;

Another object of this invention is to provide a digital transducer utilizing a stress sensitive member shaped to facilitate ease of fabrication;

Still another object of this invention is to provide a digital transducer element of great compactness;

Other objects and advantages of the invention will become apparent as the description thereof proceeds.

In accordance with one of its aspects the novel transducer includes a stress sensitive doubly refracting member of cylindrical configuration which is subjected to a compressional load along one of its diameters resulting in a continuous, non-linear stress distribution along another diameter of the cylinder. If, as the member is loaded, polarized light beams are transmitted through the cylinder at a plurality of diametral positions which are so chosen that the stresses are in the ratio $1:2:4: \ldots 2^n$, the light intensities of the beams traversing the member at these positions vary cyclically between two levels at repetition frequencies which are also related in the ratio $1:2:4: \ldots 2^n$. By positioning properly oriented analyzer and detector assemblies to intercept the emerging light beams, digital outputs are produced which represent the input load in binary coded form.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

Figure 1 is a diagrammatic representation of the stress distribution in a cylindrical stress sensitive member under diametral compression;

Figure 2 is a fragmentary perspective showing of a digital transducer utilizing a cylindrical stress sensitive member;

Figure 6:
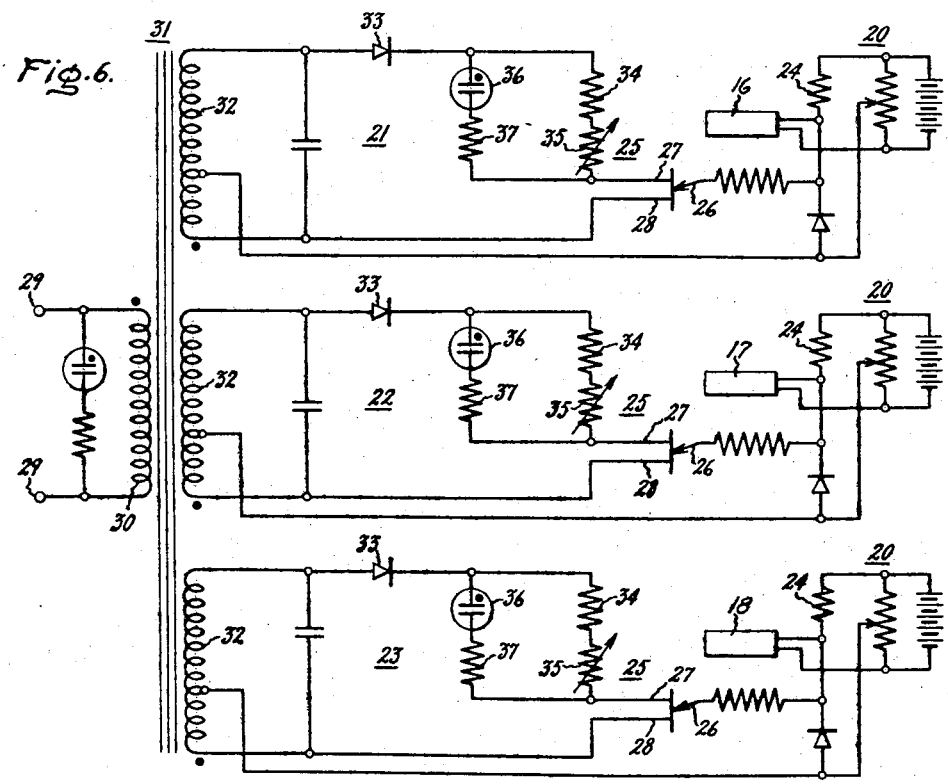
Figure 7:
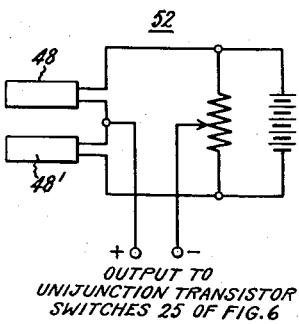

Figures 3, 4, and 5 are alternative embodiments of the transducer assembly of the instant invention;

Figures 6 and 7 are schematic circuit diagrams of output circuits useful with the devices of Figures 1–5.

Referring now to Figure 1 of the drawings, a diagrammatic plan view of a cylindrical stress sensitive member 1 is shown, which member is subjected to diametral compression in the manner indicated. The cylindrical member 1 may be fabricated of a material which exhibits temporary double refraction under stress. One such material which may be utilized in carrying out the invention is a polyurethane rubber composition which is sold by Houghton Labs. of Olean, New York, under their trade designation of #8705 Hysol; although it will be understood other stress sensitive temporary doubly refracting materials may be used instead. The polyurethane rubber is characterized by the fact that when subjected to stress it becomes temporarily doubly refracting altering the isotropic light transmitting character of the material. Thus when plane polarized light is transmitted through such a material, the rectangular wave components of the plane polarized light travel through the material with different velocities introducing a phase retardation between the two components so that the polarization of the light is changed in the course of the passage. The amount of the phase retardation and hence the change in polarization varies directly and linearly with stress on the material.

The stress distribution along the diameter 2 of a cylinder is illustrated by the curve 3 which shows that the stress distribution for any load varies continuously and non-linearly along a diameter normal to the applied load and is symmetrical about the compression axis. Thus, positions A, B, C, etc. along the diameter 2 may be chosen so that the stress relationship for applied loads always varies in the ratio of 1:2:4: ... $2^n$ as illustrated by the ordinates drawn from points A, B, C, etc. to the curve 3 and labelled S=1, S=2, S=4. When beams of plane polarized light are projected through the member 1 at the positions A, B, and C, the amounts of phase retardation resulting from the stresses in the member vary in the same ratio.

Figure 2 shows a fragmentary perspective of a digital transducer constructed in accordance with the invention to include a cylindrical stress sensitive member in compression. A plurality of plane polarized light beams 4, 5, and 6 are projected through the member 1 at positions A, B, and C etc., along the diameter 2. The spacing of the positions A, B, C is such that the stresses at these positions for any given load bear the desired binary relationship.

The polarized light beams 4, 5, and 6 are produced by projecting white unpolarized light from the incandescent sources 7, 8 and 9 through filter-polarizer elements 10, 11 and 12, which are shown as single elements for the sake of simplicity of illustration. It will be understood, however, that separate filtering and polarizing components are actually used. The elements 10, 11 and 12 convert the white light into substantially monochromatic plane polarized light. The orientation of the principal optical planes and axes of polarizer component of the elements 10, 11 and 12, which may, for example, be fabricated of a polarizing material sold by the Polaroid Corporation under the tradename Polaroid, is preferably such that the plane of polarization of the light is oriented in space at +45° to the direction of principal stresses in the member 1. For a definition of the term "principal stresses," reference is hereby made to Photoelasticity by M. M. Frocht, vol. I, John Wiley & Sons, New York (1941), and particularly Sections 1.5–1.11 of Chapter 1.

The light after traversing the member 1 at the positions A, B, C, etc. passes through polarizing analyzer elements 13, 14 and 15 which have their principal optical planes and axes oriented at right angles to those of the polarizer elements. As a result analyzers 13, 14 and 15 transmit only light polarized in a plane oriented at 90° in space relative to the light transmitted by the polarizing elements 10, 11 and 12. The polarizers and analyzers being oriented in this manner, with their optical planes crossed, minimum light is transmitted by the analyzer elements 13, 14 and 15 onto their associated detectors 16, 17 and 18 in the absence of stress in the member 1.

When load is applied to the member 1 through plunger 19, stresses of differing amounts are produced at positions A, B, and C which stresses introduce corresponding phase retardations which vary linearly with load. As a result the plane of polarization of the light beams is changed and some light is transmitted through the analyzers onto the detectors. As the load increases the plane of polarization continues to change until at a given value of load L the phase retardation at one of the positions is equal to $\pi$ radians, shifting the plane of polarization of the light 90° so that it is now oriented to correspond with the transmission axis of its analyzer which then transmits a maximum of light through the analyzers onto the detectors.

Since the stresses at the points A, B, and C are related in the binary manner (i.e., 1:2:4: ... $2^n$), a load sufficient to produce a phase retardation of $\pi$ radians at point C, produces only half that phase retardation at the point B and one quarter at the point A. Hence, if a given load L produces a phase retardation of $\pi$ radians at point C, it will require twice that load (2L) to produce a phase retardation of $\pi$ radians at point B and four times that load (4L) to produce the same retardation at point A. Since the phase retardations vary linearly with increasing load the light falling on the detectors 16, 17 and 18 vary cyclically between two levels as the retardation goes through values of $\pi$, $2\pi$, $3\pi$, $4\pi$, ... $n\pi$ radians with increasing load. Furthermore, it can be clearly seen that the frequencies of the cyclic variations are also related in the ratio 1:2:4: ... $2^n$. If the electrical characteristics of the detectors which also vary cyclically are caused to modify an output circuit to produce a digital indication or pulse whenever the light intensity is at a predetermined level, a digital output in the form of a binary representation of the input force applied to the member 1 is provided.

Figure 6 of the drawings shows a three channel output switching circuit useful with the transducer of Figure 2 to switch its output states between a binary zero (0) and binary one (1) whenever the electrical characteristics of the photosensitive detectors is such as to unbalance its associated bridge circuits sufficiently to produce a slightly positive output voltage. Each of the detectors, 16, 17 and 18, which may be photoconductive in nature, is connected as one arm of a bridge 20 to control separate output channels 21, 22 and 23. The output from each of the bridges 20 is applied by means of suitable leads to a three terminal semiconductor switching device 25 which conducts whenever the detector resistance value is such that the polarity of the voltage at the junction of the detector and its adjacent bridge arm 24 becomes positive by a predetermined increment. That is, whenever the resistance of the detectors is such that its associated bridge is unbalanced to produce a positive voltage, the emitter electrode 26 of the switching elements 25 becomes positive and the switch conducts.

The semiconductor switching devices 25 are of the unijunction transistor type and include two ohmic contact base electrodes shown at 27 and 28 and a rectifying emitter electrode 26. Operating voltage for the unijunction transistors is provided by applying a positive biasing voltage across the base electrodes 27 and 28 from a rectified source of alternating voltage. This alternating voltage may be supplied from any suitable source to the input terminals 29 of the primary winding 30 of an iron core transformer 31 which has a plurality of secondary windings 32 connected respectively in the channels 21, 22 and 23. Rectifying elements 33 are connected in series with each secondary winding 32 and are so poled that current flows in the channels during each positive alternation of the input voltage providing a pulsating D.C. voltage across resistors 34 and 35 connected in series with the unijunction transistor 25. An indicating neon glow lamp 36 and a dropping resistance 37 are connected in parallel with the resistors 34 and 35 to complete the circuit.

In operation, during each positive alternation of the supply voltage, a positive forward biasing voltage is applied across the base electrodes 27 and 28. In the absence of a positive voltage from the bridges 20, however, the emitter 26 is reverse biased so that only a small emitter leakage current flows. Consequently the interbase resistance of the unijunction transistor is very high compared to that of the resistances 34 and 35 and most of the positive biasing voltage appears across the unijunction transistor 25. Under these circumstances the voltage across the neon glow tubes 36 is insufficient to ionize the gas and the glow tubes are extinguished. Whenever the polarity of the bridge output changes in the positive direction, a positive voltage is applied to the emitter 26 overcoming the reverse biasing and initiating the flow of emitter current. The flow of emitter current produces a negative resistance characteristic in the switch and the interbase resistance of unijunction transistor 25 drops to a very low value. As a result, most of the voltage now appears across the resistors 34 and 35, and the voltage across the glow lamps 36 is sufficient to ionize the gas indicating the presence of a binary one (1) pulse condition.

If the light intensities, which vary cyclically with increases in load, drop below the predetermined level, the output signals from the bridges 20 are again negative, raising the resistance of the unijunction transistors and extinguishing neon glow lamps 36 and indicating a binary zero (0) condition. Since the loads at which the individual bridges 20 of the three channels become positive enough to switch the unijunction transistors 25 occur cyclically, and the frequency of these cyclic variations are in the ratio $1:2:4: \ldots 2^n$, it will be apparent that the glow tubes 36 in the various output channels are energized and de-energized in a predetermined binary sequence with load variations and the particular combination of energized and de-energized glow lamps visually represents the applied load in binary form.

Another form of a digital transducer assembly is illustrated in Figure 3 which is characterized by the fact that a balanced output is utilized so that only the relative intensities of the light beams need be measured. The transducer of Figure 3 is so constructed that it is insensitive to variations in operating parameters other than the applied load. Thus, for example, such operating parameters as light source intensity, detector sensitivity, etc., do not affect the output from the transducer assembly. In the apparatus of Figure 2, output signals in binary form are produced in response to the light intensity variations sensed by the various detectors. However, in the system of Figure 2 the absolute value of the light intensity is being measured and hence any variation in the intensity of emission from the light sources, or any change in sensitivity due to aging of the detector elements may introduce errors and ambiguities into the binary output.

In order to eliminate this source of error and ambiguity the digital transducer assembly of Figure 3 is arranged to measure the relative rather than the absolute values of the light intensities. To this end, the stress sensitive cylindrical member 1 is positioned in the path of a plurality of monochromatic plane polarized light beams 39, 40, 41, 42, 43 and 44. The light beams are positioned symmetrically on either side of the axis of compression so that the light beams 39, 40, and 41 are transmitted through the member 1 at the positions A, B, and C whereas the light beams 42, 43 and 44 are transmitted through the member 1 at corresponding positions A', B', C'. Since, as shown by the curve 3 of Figure 1, the stress is distributed symmetrically about the axis of compression, any position on one side of the axis of symmetry has a mirror image position. Consequently, the amount of phase shift which the light beam undergoes is equal for corresponding position pairs A and A', etc.

The plane polarized light beams 39, 40 and 41 after emerging from the member 1 pass through polarizing analyzers 45, 46 and 47 onto the detectors 48, 49 and 50 while the light beams 42, 43 and 44 pass through polarizing analyzers 45', 46' and 47' onto detectors 48', 49' and 50'. The analyzer pairs 45 and 45', 46 and 46', 47 and 47' are so oriented in space that the principal optical planes and axes of each analyzer pair are crossed. It follows, therefore, that one analyzer of each pair is parallel to principal optical plane of its associated polarizer element 51, while the remaining analyzer is crossed; i.e., analyzers 45, 46 and 47, for example, have their planes parallel to polarizers 51, while analyzers 45', 46', 47' are crossed. As a result, the light intensity variations as seen by the detector at corresponding positions; A and A', B and B', C and C', are 180 degrees out of phase. The output terminals of detector pairs 48 and 48', 49 and 49', and 50 and 50' are connected at $a''$, $b''$, $c''$, as two adjacent arms of a bridge 52 shown in Figure 7 which bridge is unbalanced to provide a positive output voltage only when the relative magnitudes of the detectors resistances reaches a predetermined value in response to the varying light intensities. That is, whenever the resistances of detectors 45', 46', 47' are larger than those of detectors 45, 46 and 47, the bridge is unbalanced to produce a positive voltage for energizing a unijunction transistor switch in an output circuit such as those shown in Figure 6. If, on the other hand, the resistances of detectors 45, 46, 47 are larger, the bridge is still unbalanced but the polarity of the output voltage is such that the switching elements in the output circuits will not be energized. It will be immediately apparent that since both beams are subject to variations in source intensity, the effects cancel and inaccuracies due to variations in the light source or aging in the detector are eliminated from the output and a much more accurate and stable system is provided.

In the digital transducer devices illustrated in Figures 2 and 3, the light beams pass through the stress sensitive members at such points that the stresses at these points are always in a predetermined ratio. Because of the non-linear distribution of the stress in the member, the spacing of the detectors and the polarized light beams sources will not be in the ratio of $1:2:4: \ldots 2^n$ but may be much closer and may present a space problem particularly for small compact units having a large number of stages. It may be desirable, therefore, to take advantage of the stress distribution symmetry about the compressional axis in a different manner. Figure 4 illustrates such an arrangement. Thus, rather than having consecutive positioning of the light sources 53, detectors 54, analyzers 55, and polarizers 56 on one side of the compression axis, one or more of the elements may be positioned at the mirror image position shown at B' which has the same stress-load characteristic as that at point B. In this manner, the crowding of the component is minimized.

In the digital transducer discussed above a stress sensitive member of cylindrical configuration has been utilized. However, the invention is not limited thereto and o her configurations of the stress distribution member having a continuous non-linear characteristic may obviously be utilized. Figure 5 illustrates one such digital transducer utilizing a non-linear stress distribution member. A toroidal stress sensitive member 61 having a slotted portion 62 is provided. As a compressive load F is applied to the member at the notched portions 63, a logarithmic stress distribution is produced along the diameter 64, as illustrated by the superimposed curve 65. A plurality of plane polarized light beams 66, 67 and 68 traverse the member along diameter 64 at a plurality of points which are so positioned that the desired $1:2:4: \ldots 2^n$ stress and phase retardation ratio is maintained.

The light beams 66, 67 and 68 are generated by projecting unpolarized white light from the incandescent sources 69, 70 and 71 through the filter polarizer element 72, 73 and 74 to produce beams of substantially monochromatic plane polarized light. The plane polarized beams after being modified by the action of the stress sensitive member 61 to produce desired cyclic light intensity variations in response to applied load are projected through analyzer elements 75, 76 and 77 onto detector elements 78, 79 and 80 to produce a digital output in the manner previously described.

In discussing the various stress sensitive members illustrated in Figures 2, 3, 4, and 5, the polarized light beams and their associated polarizers, analyzers and detectors are shown positioned along a diameter of the stress sensitive member which is normal to the axis of the applied compressional load. However, it should be realized that the invention is not limited thereto since the light beams may be positioned to pass through the stress sensitive member at any position as long as the stresses at the various positions follow the desired binary relationship. Hence, the illustrated positional relationship of the light beams and their associated components and circuitry is by way of illustration only and is not to be considered as being limited thereto.

While a particular embodiment of this invention has been shown, it will, of course, be understood that it is not limited thereto since many other modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a digital transducer the combination comprising a temporary doubly refracting member for producing phase retardation of an incident beam of light in response to a load induced stress, said member being shaped so that the stress distribution in said member is continuously variable, means to project plane polarized light through said member at a plurality of positions such that the stresses at said positions are always related in a predetermined ratio, means to apply a load to said member to produce a plurality of cyclic light intensity variations with load corresponding to the stress distribution ratio, and means to receive said light and produce a digital signal for each alternation of the plurality of light intensity variations.

2. In a digital transducer the combination comprising a temporary doubly refracting member adapted to retard the phase of incident plane polarized light in response to load induced stress in said member to produce intensity variations varying cyclically with increasing load, said member being shaped so that the stress distribution throughout said member is continuous and non-linear with applied load, means to project plane polarized light through said member at a plurality of positions so spaced that the stresses at said positions are always related in a binary coded relationship, means to apply a load to said member to introduce light phase retardations and vary the intensity of the light passing through said position cyclically with load at frequencies related in a binary coded relationship, and means to receive the light transmitted through said member to produce a digital signal for each alternation of the plurality of light intensity variations whereby a binary coded representation of the applied load is provided.

3. In a digital transducer the combination comprising a temporary doubly refracting member adapted to retard the phase of incident plane polarized light in proportion to the stress induced in said member by an applied load to cause the intensity of said incident light to vary cyclically with load, said member being of cyclindrical configuration whereby the stress distribution is non-linear throughout said member, means to project plane polarized light through said member at a plurality of positions so spaced that the stresses at said positions are always related in a binary coded relationship, means to apply load to said member to introduce said phase retardation and vary the intensity of the light passing through said positions cyclically at frequencies related in a binary coded relationship, and means to receive the light transmitted through said member to produce digital signals for each alternation of the plurality of light intensity variations whereby a binary coded representation of the applied load is provided.

4. In a digital transducer the combination comprising a temporary doubly refracting member adapted to retard the phase of incident plane polarized light in proportion to stress induced in said member by an applied load to vary the intensity of said incident light cyclically with load, said member being of cylindrical configuration whereby the stress distribution is non-linear along a diameter of said member, means to project plane polarized light through said member at a plurality of positions along said diameter which are so spaced that the stresses at said positions are always related in a binary coded relationship, means to apply a compressional load to said member to produce said non-linear stress distribution along said diameter and introduce said phase retardation so that the intensity of the light passing through said plurality of positions varies cyclically at a plurality of frequencies related in a binary coded relationship, means to receive the light transmitted through said member and produce digital signals for each intensity alternation of the plurality of light variations whereby a binary coded representation of the applied load is provided.

5. In a digital transducer the combination comprising a temporary doubly refracting member adapted to be positioned in a field of polarized light to produce cyclic intensity variations of the light with applied load, means to apply a load to said member to produce stress distributions with load resulting in the cyclic variation of the light intensity, said member being so shaped that stress distribution in said member is non-linear and light passing through different portions thereof varies in intensity at different cyclic rates, and means to intercept light passing through said member at selected positions and produce digital outputs in response thereto including means to produce in response thereto simultaneously a binary "one" (1) indication for one alternation of each of the cyclic variations and a binary "zero" (0) indication for the other alternation of each of the cyclic variations whereby the instantaneous combination of binary ones (1) and binary zeros (0) is representative of the applied load.

6. In a digital transducer the combination comprising a cylindrical member which is temporarily doubly refracting under load to produce intensity variations in an incident plane polarized light beam which vary cyclically with applied load, means to apply a compressive load along a diameter of said member whereby a non-linear stress distribution is produced along a diameter normal thereto, means to project plane polarized light through said member at a plurality of positions along said normal diameter, said positions being so spaced that the stresses at said positions are always related in a binary coded relationship so that the intensity of the light transmitted at said positions varies cyclically at plurality of frequencies related in a binary coded relationship, means to receive the light transmitted through said member at the plurality of positions and produce digital outputs in the form of binary "ones" (1) and "zero" (0) indications for the individual alternations of each of the plurality of light intensity variations whereby a binary representation of the applied load is provided.

7. The digital transducer of claim 6 wherein the light transmitting positions are distributed along the normal diameter on both sides of the diameter along which the load is applied.

8. In a digital transducer the combination comprising a member which is temporarily doubly refracting under load to produce cyclic intensity variations in incident plane polarized light with load, said member being so shaped that the stress distribution in said member is substantially logarithmic along one dimension thereof, means to apply a load to said member, means to project polarized light through said member at a plurality of positions along said dimension so that the intensities of the light passing through said positions are caused to vary at a plurality of cyclic rates related in a binary relationship, and means to intercept said light and to produce binary "one" (1) and "zero" (0) indications in response to each individual alternation of each of the plurality of cyclic light intensity variations whereby a binary representation of the applied load is provided.

9. The digital transducer of claim 8 wherein said member is a toroid.

No references cited.